(12) United States Patent
Butterworth et al.

(10) Patent No.: US 7,415,559 B1
(45) Date of Patent: *Aug. 19, 2008

(54) DATA PROCESSING SYSTEMS AND METHOD FOR PROCESSING WORK ITEMS IN SUCH SYSTEMS

(75) Inventors: Henry Esmond Butterworth, Chandlers Ford (GB); Carlos Francisco Fuente, Portsmouth (GB); Robert Frank Maddock, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,676

(22) Filed: Sep. 22, 1999

(30) Foreign Application Priority Data

Mar. 23, 1999 (GB) ................................ 9906501.3

(51) Int. Cl.
*G06F 13/24* (2006.01)
*G06F 13/22* (2006.01)
(52) U.S. Cl. ...................................... 710/261; 710/220
(58) Field of Classification Search ................. 709/201; 711/103, 148; 710/57, 266, 263, 200, 260; 704/500; 718/100, 107
See application file for complete search history.

(56) References Cited

U.S. PATENT DOCUMENTS 4,980,820 A * 12/1990 Youngblood .................... 710/6
5,274,823 A * 12/1993 Brenner et al. ............... 710/200
5,414,858 A * 5/1995 Hoffman et al. ............... 710/48

(Continued)

FOREIGN PATENT DOCUMENTS

DE   EP0192956 A1 * 9/1986

(Continued)

OTHER PUBLICATIONS

Douglas Comer. Operating System Design The Xinu Approach. 1984. Prentice Hall,Inc. p. 113-121.*

(Continued)

*Primary Examiner*—Christian LaForgia
(74) *Attorney, Agent, or Firm*—Anne V. Dougherty; Ryan, Mason & Lewis, LLP

(57) ABSTRACT

Described is a method for processing work items in a data processing system. An interrupt is generated in response to receipt of a work item on a queue and the generated interrupt is serviced to schedule a task by placing the task on a task queue for later processing of the queued work item. The interrupt is not enabled at this point and therefore the receipt of further work items will not result in the generation of interrupts. When the scheduled task reaches the head of the queue, the task is executed to process the queued work item (and all other work items that have been added to the queue since the task was scheduled). When all the work items have been processed, a further task is speculatively scheduled for processing of any work items that are subsequently placed on the work item queue. When the speculatively scheduled task reaches the head of the queue, it is executed to process queued work items; if any work items were found, a further task is speculatively scheduled, otherwise the interrupt is enabled.

3 Claims, 4 Drawing Sheets

U.S. PATENT DOCUMENTS

| | | | | |
|---|---|---|---|---|
| 5,555,420 | A * | 9/1996 | Sarangdhar et al. | 710/266 |
| 5,560,018 | A * | 9/1996 | Macon et al. | 710/260 |
| 5,590,288 | A * | 12/1996 | Castor et al. | 709/201 |
| 5,606,703 | A * | 2/1997 | Brady et al. | 710/264 |
| 5,682,554 | A * | 10/1997 | Harrell | 710/57 |
| 5,784,647 | A | 7/1998 | Sugimoto | |
| 5,911,065 | A * | 6/1999 | Williams et al. | 718/107 |
| 5,931,939 | A * | 8/1999 | Chung et al. | 710/263 |
| 5,933,598 | A * | 8/1999 | Scales et al. | 709/216 |
| 5,950,228 | A * | 9/1999 | Scales et al. | 711/148 |
| 5,995,745 | A * | 11/1999 | Yodaiken | 703/26 |
| 6,081,783 | A * | 6/2000 | Divine et al. | 704/500 |
| 6,169,929 | B1 * | 1/2001 | Izzo et al. | 700/18 |
| 6,189,070 | B1 * | 2/2001 | See et al. | 711/103 |
| 6,192,441 | B1 * | 2/2001 | Athenes et al. | 710/262 |
| 6,385,704 | B1 * | 5/2002 | Rao et al. | 711/151 |
| 6,594,698 | B1 * | 7/2003 | Chow et al. | 709/226 |

FOREIGN PATENT DOCUMENTS

| | | |
|---|---|---|
| EP | 0 192 956 A1 | 9/1986 |
| GB | 2 320 113 A | 6/1998 |

OTHER PUBLICATIONS

Polge et al., "Reducing CPU Utilization by Controlling Transmit Complete Interrupts," IBM Technical Disclosure Bulletin vol. 38, No. 07, pp. 497-499, Jul. 1995.

* cited by examiner

HOST WORK ITEMS

DATA PROCESSING SYSTEMS AND METHOD FOR PROCESSING WORK ITEMS IN SUCH SYSTEMS

FIELD OF THE INVENTION

The present invention relates generally to processing of work items in data processing systems and more particularly to the scheduling of tasks to process such work items.

BACKGROUND OF THE INVENTION

In modern data processing systems there are two well established methods for the communication required between hardware and software for software control of hardware devices within the system: interrupts and polling. With interrupts, each hardware device signals that there is work for the software to do by asserting an interrupt line which causes the software flow-of-control to be diverted to an interrupt handler which handles the interrupt. An interrupt is typically handled by masking (or disabling) the interrupt and scheduling a task for later execution which will service the requesting device. Once the device has been serviced, the interrupt is unmasked (or enabled) again ready to allow the generation of further interrupts. With polling, the device driver continually checks the status of the device to determine whether it needs to be serviced. If so, the device is serviced.

With polling based systems, there is a trade-off between polling frequently so as to service the device with low latency and polling infrequently so as to keep the overhead of polling to a minimum. With interrupt-based systems, the device is serviced with low latency and low overhead when it is relatively idle but when the device becomes heavily utilised and is generating many interrupts the increased interrupt overhead can make the interrupt method inefficient. Generally speaking therefore, an interrupt based system is more efficient at relatively low device utilisation and a polling based system is more efficient at relatively high device utilisation. Neither technique is especially well adapted to the situation where the device presents varying amounts of work to the system.

Attempts have been made in the art to reduce the interrupt overhead in interrupt-based systems. In IBM Technical Disclosure Bulletin Vol 38 No 7 pp 497-500, a technique is described that is designed to reduce the number of interrupts generated by a LAN adapter. One type of interrupt (transmit complete) which does not impact response time is turned off thus reducing system disruption and CPU utilisation. An alternative method for identifying and reporting transmit completions is provided. Although the described technique goes some way to reducing interrupt overhead in the described environment, it necessitates the provision of an alternative method to handle the disabled interrupt.

It would be desirable to have a system having low latency at low workload levels and low overhead at high workload levels.

DISCLOSURE OF THE INVENTION

According to a first aspect of the invention there is provided a method for processing work items in a data processing system comprising: generating an interrupt in response to receipt of a work item in the system; servicing the generated interrupt to schedule a task for later processing of the work item, without re-enabling the interrupt; subsequently executing the task to process the work item; and speculatively scheduling a further task for processing of any work items that are subsequently received in the system.

The present invention is thus contrasted with prior systems in which, when an interrupt is serviced and a task scheduled for later execution, the interrupt is enabled/unmasked. Thus in prior systems, the receipt of further work items will cause the generation of further interrupts. In the present invention, the interrupt is not enabled when the interrupt is serviced and therefore further work items will not generate interrupts. When the task executes, it processes the work items after which a speculative task is scheduled and added to the task queue. The task is speculative in the sense that when it is generated there are no work items on the queue to be processed. However it is anticipated that further work items will have been added by the time the speculative task reaches the head of the task queue and is executed.

In accordance with one embodiment of the invention, the method could include the step of continually scheduling speculative tasks (i.e. polling) for processing of work items that may subsequently be received in the system. However this embodiment, which effectively comprises the use of a single interrupt followed thereafter by polling, is only suitable for systems which have a device which is either never used or is always heavily used during the period of time between system resets.

In a preferred method, when the speculatively scheduled task is executed to process any work items received by the system and it is determined that there are no work items, the interrupt is enabled. Thus when the system is fully utilised, the interrupt mechanism is replaced with a polling mechanism involving a continuous series of speculatively scheduled tasks. However when the system or device utilisation decreases, i.e. when there are no work items when the speculatively scheduled task is processed, then the system reverts to interrupts.

In one alternative embodiment, when device presents a work item to the system, the device operation may stall pending processing of the work item by the scheduled task. This embodiment may provide a benefit in terms of overall system performance in the case where the system throughput is limited by processor utilisation because the interrupt overhead would be eliminated. In a preferred embodiment however, a work item queue is maintained for the interrupting device so that the operation of the device is not halted when the interrupt is disabled.

According to another aspect of the invention there is provided a data processing system comprising: processing means for executing tasks to process work items in the data processing system; and interrupt generating means for generating an interrupt in response to receipt of a work item in the system; wherein the processing means is operable to: service the generated interrupt to schedule a task for later processing of the work item, without re-enabling the interrupt; subsequently execute the task to process the work item; and speculatively schedule a further task for processing of any work items that are subsequently received in the system.

According to a further aspect of the invention there is provided a computer program product comprising a computer usable medium having computer readable program code means embodied in the medium for processing work items in a data processing system, the program code means comprising: code means for causing the data processing system to service a generated work item interrupt to schedule a task for later processing of the work item, without re-enabling the interrupt; code means for causing the data processing system to subsequently execute the task to process the work item; and code means for causing the data processing system to speculatively schedule a further task for processing of any work items that are subsequently received in the system.

The computer program product according to the further aspect of the invention may be implemented in a read-only memory, magnetic tape or diskette.

The present invention may advantageously be used to reduce overall latency in any interrupt based data processing system where it is expected that there will be a delay between scheduling and execution of tasks.

BRIEF DESCRIPTION OF THE DRAWINGS

A preferred embodiment of the present invention will now be described with reference to the accompanying drawings in which.

DESCRIPTION OF THE PREFERRED EMBODIMENTS

In the following the present invention will be described in relation to a storage controller (e.g. storage adapter card) receiving work items from an attached host system. It will be appreciated that this is by way of example only—the invention may be used in many suitable systems.

Figure 1:
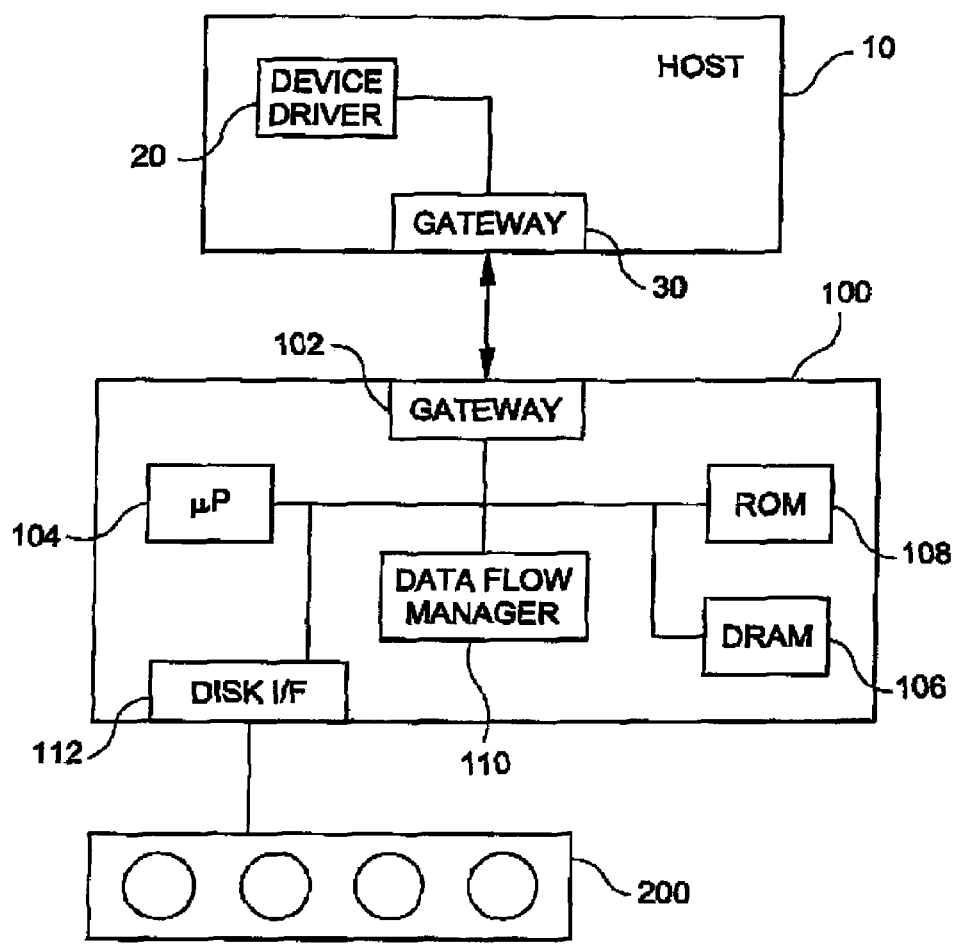
FIG. 1 is a schematic representation of a processing apparatus embodying the invention.
Figure 2:
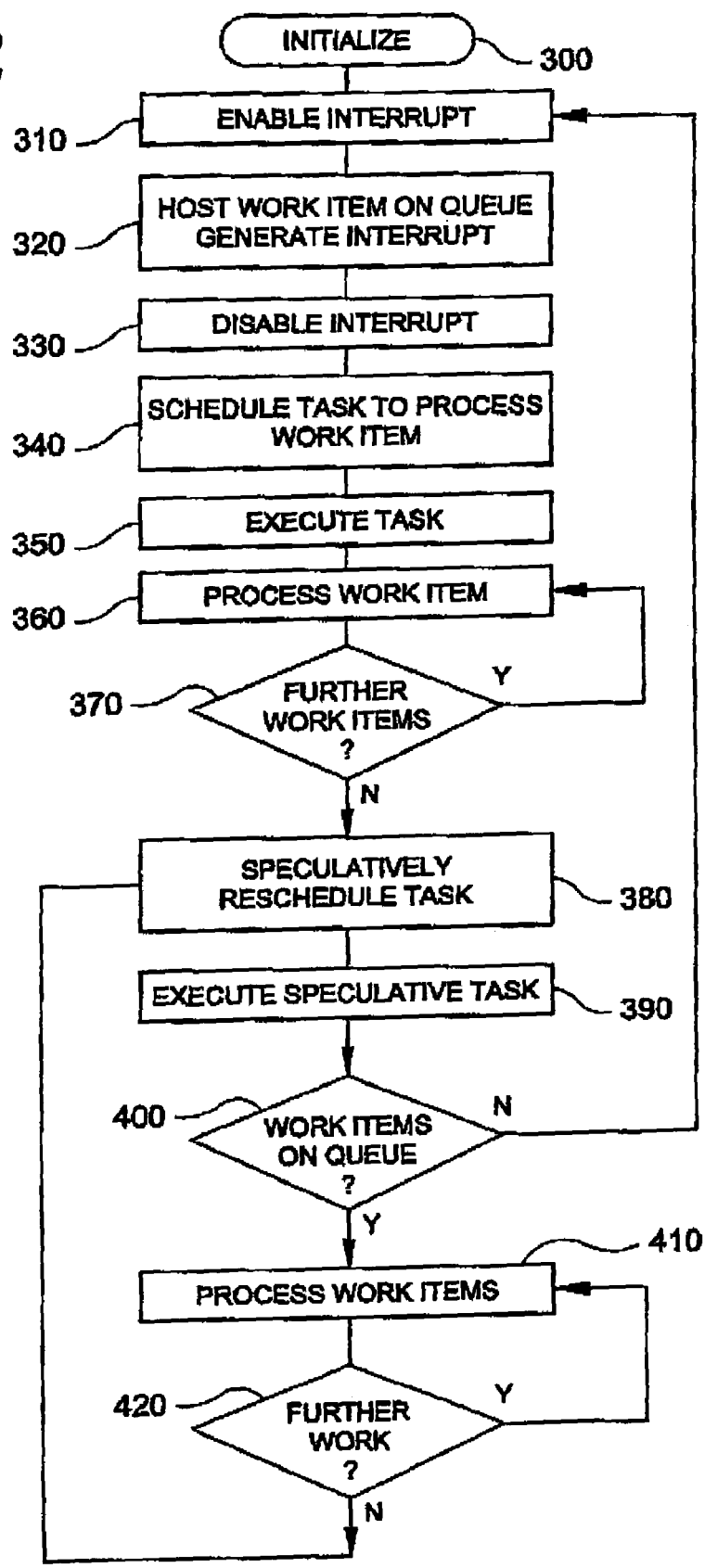
FIG. 2 is a flow diagram showing the steps involved in a method according to a preferred embodiment of the invention.

With reference first to FIG. 1, there is shown a processing apparatus comprising a host system 10, which may be a personal computer system, workstation, mainframe or the like, for example an IBM RS/6000 system running the AIX operating system. The host system includes a device driver 20 and a gateway 30 for providing communication between the device driver and an attached storage controller 100. In the present embodiment, the storage controller takes the form of an adapter card which plugs into a bus (for example a PCI bus) within the host system. The storage controller is in turn attached for communication with a storage subsystem 200 that may comprise an array of data storage disk devices.

The storage controller includes a gateway 102 for communicating with the host system, a microprocessor 104 and DRAM 106 for storing data and metadata, including data being transferred between the host and storage subsystem. Also provided as part of the storage controller is ROM 108 in which is stored firmware that executes on the microprocessor to provide a variety of different services within the controller. The services take the form of a variety of different tasks which are scheduled on a task queue for execution by the microprocessor. One service provided by the firmware is the processing of requests from the host system to read and write data from and to the storage subsystem. Each such data transfer request will generally involve a number of different firmware tasks which during the operation of the controller are placed on the task queue within the DRAM. Disk interface 112 provides the communication interface to the storage subsystem. The controller further includes data flow manager 110 that is adapted to control the data flow within the controller. As will be described below, the data flow manager receives work items from the host system and generates interrupts for servicing by the controller firmware.

Next will be described, in general terms, the operation of the processing apparatus of FIG. 1. In response to host application requests for data, the host system device driver generates host transactions (otherwise referred to herein as work items) for processing by the storage controller. The work items are transferred via the gateway to the storage controller and placed on a work item queue in DRAM by the data flow manager. In response to receipt of each work item, a task is caused to be placed on a task queue in DRAM for subsequent execution by the microprocessor. To take the example of a disk write operation, the appropriate task is placed on the task queue for subsequent execution on the processor to DMA the write data from the host system memory into the controller DRAM. It should be noted that tasks other than those involved in processing host work items will also be placed on the task queue for execution by the microprocessor. In the present embodiment, the task queue is managed by the microprocessor as a FIFO queue in a manner well known in the art, with tasks added to the tail of the queue.

In prior systems of this type which are interrupt driven, the receipt of a work item at the controller will result in the generation of an interrupt to the microprocessor. As discussed previously, such a system provides low latency and low overhead provided that the rate of interrupts is low. If however, the number of work items from the host is significantly increased, the interrupt overhead will be increased to a level which may impact the overall operation of the controller microprocessor.

With reference next to FIG. 2 and FIGS. 3A to 3C, there will be described a process, operable on the storage controller of FIG. 1, for processing work items from the host system in a manner that combines the best attributes of the polling and interrupt methods to service the host work items with low latency at low utilisation and by polling for low overhead at high utilisation.

In accordance with the present embodiment, the process starts at step 300 where the controller is initialised. At step 310, the host work item interrupt is enabled ready to allow the generation of a host work item interrupt in response to receipt of a work item at the controller. At step 320, a host work item is received by the controller data flow manager and placed on the host work item queue in DRAM. As the interrupt is enabled, the data flow manager generates an interrupt to the microprocessor which causes the microprocessor to halt its operation and to load the appropriate interrupt handler code from ROM. At step 330, the microprocessor disables the interrupt thereby preventing the generation of any host interrupts pending processing of the work item. At step 340, the interrupt handler schedules a task for processing the work item by placing the task on a FIFO task queue within the DRAM. The interrupt handler then completes and the processor returns to the operation it was carrying out prior to the interruption. In contrast with prior systems, the interrupt is not enabled at this point; this means that if and when a further work item is received on the work item queue, an interrupt is not generated. The status of the work item and task queues at this stage of the process can be seen in FIG. 3A. The work item queue includes one item I1 and the task queue includes a number of tasks including T1 at the tail of the task queue.

Unless it is subject to other interruptions from other devices, the microprocessor continues by processing the tasks on the queue and eventually task T1 reaches the head of the queue. During the period between when task T1 was placed on the queue and when T1 reached the head of the queue, three further work items have been queued by the data flow manager. As the interrupt was disabled, no interrupts were generated in response to receipt of these work items. The status of the work item and task queues at this stage of the process can be seen in FIG. 3B in which the work item queue includes three item I1 to I3 and the task queue includes a number of tasks including task T1 at the head of the queue.

At step 350 the scheduled task T1 is loaded and executed by the microprocessor to process the work item I1 (step 360). At step 370, the processor checks for further work items on the work item queue and on finding item I2, processes that as well. The processor continues to check for and process further work items until the queue is empty.

Figure 3A:
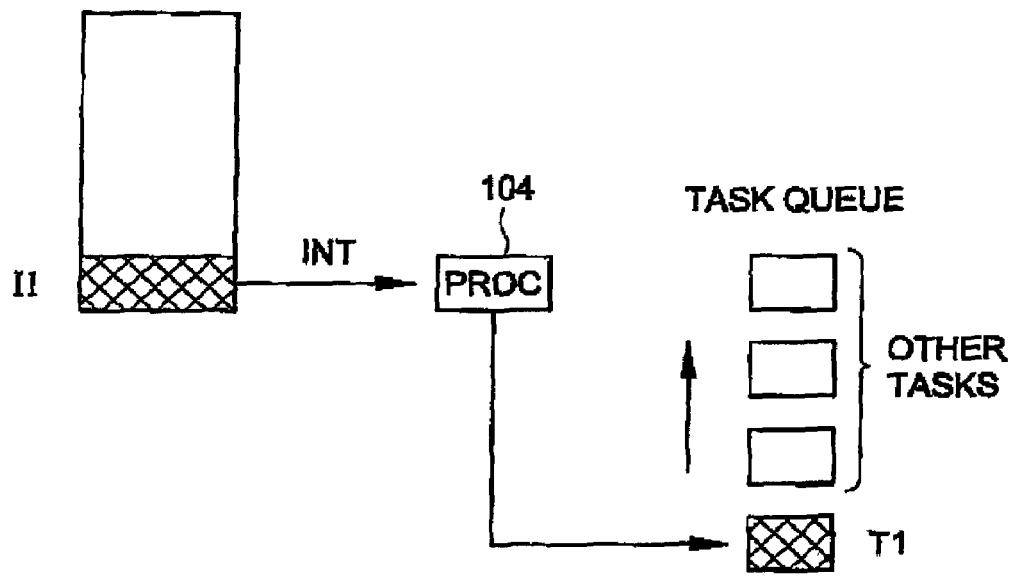
FIGS. 3A, 3B and 3C are schematic representations of the state of the task and work item queues of the preferred embodiment of the invention at different stages of the method of FIG. 2.
Figure 3B:
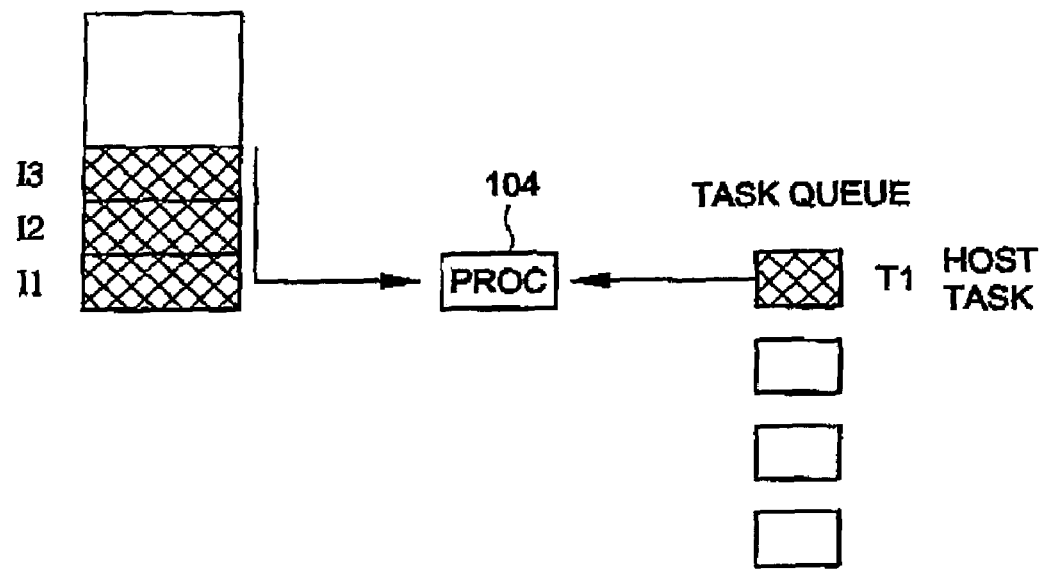
Figure 3C:
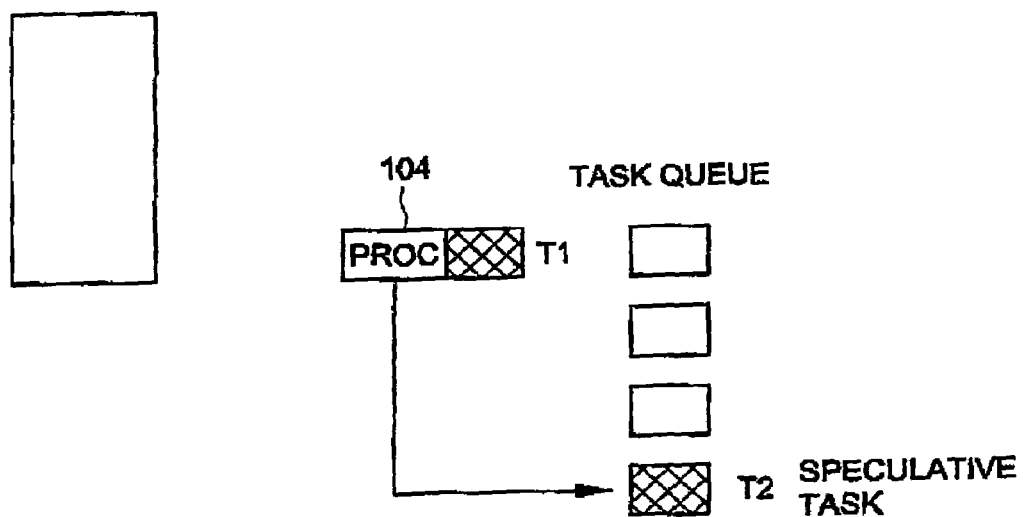

In accordance with the embodiment of the invention, on finding the queue to be empty, the processor, at step 380, causes a further task for processing host work items to be scheduled by placing it on the task queue. The interrupt is not enabled/unmasked. The status of the work item and task queues at this stage of the process is as indicated in FIG. 3C in which the work item queue is empty and the task queue includes a number of tasks including the speculatively scheduled task at the tail of the queue.

This further task is speculative in nature in the sense that the processor is anticipating that further work items will appear on the queue in the meantime and therefore when the speculative task reaches the head of the queue, it will have work items to process. Because the interrupt is not enabled when the speculative task was scheduled, none of the work items which are subsequently added to the queue will generate interrupts, thus avoiding interrupt overhead.

Again assuming that no further interrupts are received, the microprocessor continues by processing the tasks on the queue until task T2 reaches the head of the queue. At step 390, the microprocessor executes task T2 which determines (step 400) whether there are any work items on the work item queue. If yes, the task processes the queued work items at step 410. On a determination that there are no further work items, the processor causes a further speculative task to be scheduled (step 380) and placed on the task queue. Although this scheduling of a speculative task involves a certain amount of overhead, this is worthwhile in view of the likelihood that the work items will continue to be placed on the queue.

If at step 400 it is determined that there are no host work items on the queue, then the process moves to step 310 and the interrupt is enabled/unmasked. Thus when no further work items have been added to the queue in the time between the task T2 is added to the task queue and when it reaches the head of the queue, the host and/or controller workload is low and the process reverts to an interrupt driven process for the host work item interrupts.

Thus it will be noted that when the controller is relatively busy (i.e. when there are many different tasks on the task queue), the speculatively scheduled task will be delayed by other tasks which are currently in progress and thus the length of the delay will increase according to how busy the controller is. During the period the speculative task is delayed, work items from the host will be added to the queue. Because the interrupt is disabled/masked, none of these work items results in the generation of an interrupt and therefore the interrupt overhead which would occur in prior systems is avoided. When the speculative task reaches the head of the queue all the pending work items are processed.

When both the arrival rate of host work items and the controller utilisation are low, the pattern of operation is that an arriving host work item generates an interrupt which schedules a task to service the work item. The task services the work item and a speculative task is scheduled. The speculatively scheduled task is executed a relatively short time after the interrupt scheduled task because there are few other outstanding tasks to execute on the controller between the interrupt scheduled task and the speculatively scheduled task. The short delay between the interrupt scheduled task and the speculatively scheduled task and the low arrival rate of host work items means that the speculatively scheduled task does not find host work items waiting when it polls for them so the speculative polling process is terminated and the interrupt mechanism is restored after only one speculatively scheduled task. Thus the host system is serviced with the low latency of the interrupt method with some additional overhead caused by the speculatively scheduled tasks. This additional overhead does not impact the overall operation of the controller because the system is relatively idle and the controller is under-utilised.

As the arrival rate of host work items increases and/or the controller utilisation increases (due for instance to an increased arrival rate of work items from a different source), there is more opportunity for host work items to arrive between the interrupt scheduled task and the speculatively scheduled task (or between a speculatively scheduled task which found host work items and the speculatively scheduled task which was scheduled as a result) so the speculatively scheduled task will more frequently find host work items waiting and the speculative polling process will go on for longer before the interrupt mechanism is restored. Thus the number of interrupts avoided and the size of the 'batches' of work items processed by each task increases both with the arrival rate of host work items and with the utilisation of the controller.

Although on the face of it, it might appear that by use of the technique described above, the delays in processing the work items might increase the latency of the system at high utilisations over that of the conventional interrupt method, this is not in fact the case. The reduced overhead of this technique more than compensates by keeping the queue depth down. In the limit, the present invention allows the system to operate with relatively low latency at throughputs beyond the limit where the conventional interrupt method would have caused the queue depth and latency to tend to infinity.

While an embodiment of the invention have been described in detail above, it will be apparent to those skilled in the art that many variations and modifications can be made without departing from the scope of the invention. In particular, although in the described embodiment, the queued work items were host transactions, it will be appreciated that the use of the invention in a storage controller is not limited to such operations. For example, the technique of the present invention may be used with other interrupt-generating events such as DMA completions and messages received from an attached storage controller. Multiple queues would be maintained in the event that the technique of the present invention is used in relation to multiple events.

Furthermore, although the invention has been described in relation to a storage controller, it will be apparent that the invention may be used in any data processing system in which interrupts are generated in response to the receipt of work items from a device.

In addition, although the work items are described as being managed in a queue, in alternative embodiments, the work items may be arranged as an array where a work item exists in a fixed location and is marked as requiring servicing by the hardware setting a bit in the array.

The invention claimed is:

1. A method of processing work items in a data processing system, comprising:
  scheduling a speculative task, wherein the speculative task, when executed, is operative to determine whether additional work items for processing have been received between the scheduling of the speculative task and the execution of the speculative task;

responsive to a determination by the speculative task that no additional work items for processing have been received between the scheduling of the speculative task and the execution of the speculative task, transitioning from a polling-based mechanism to an interrupt-based mechanism for processing work items; and responsive to a determination by the speculative task that additional work items for processing have been received between the scheduling of the speculative task and the execution of the speculative task, transitioning from an interrupt-based mechanism to a polling-based mechanism for processing work items.

2. A method as claimed in claim 1 wherein work items are received in accordance with at least one device driver associated with a host system.

3. A method as claimed in claim 1 wherein the data processing system comprises a storage controller.

* * * * *